United States Patent [19]

Pelchat et al.

[11] Patent Number: 5,455,960
[45] Date of Patent: Oct. 3, 1995

[54] LOW-POWER ACCESS TECHNIQUE FOR CERTAIN SATELLITE TRANSPONDERS

[75] Inventors: Guy M. Pelchat, Melbourne; Stephen G. Powers, Indian Harbour Beach; Raymond F. Cobb, Melbourne Beach; Robert C. Hildebrand, Indialantic, all of Fla.

[73] Assignee: Harris Corporation, Melbourne, Fla.

[21] Appl. No.: 821,392

[22] Filed: Jan. 16, 1992

[51] Int. Cl.[6] .................................................. H04B 7/185
[52] U.S. Cl. ........................... 455/12.1; 455/21; 342/353; 342/367
[58] Field of Search ..................... 455/12.1, 13.1, 455/13.2, 13.3, 13.4, 17, 21, 23; 370/104.1; 342/352, 353, 367

[56] References Cited

U.S. PATENT DOCUMENTS

| | | | |
|---|---|---|---|
| 3,546,386 | 12/1970 | Darcey | 455/12.1 X |
| 4,748,622 | 5/1988 | Muratani et al. | 370/104.1 X |
| 5,033,108 | 7/1991 | Lockwood | 455/13.2 X |
| 5,066,957 | 11/1991 | Mizuno et al. | 455/13.1 X |

*Primary Examiner*—Edward F. Urban
*Attorney, Agent, or Firm*—John L. DeAngelis, Jr.

[57] ABSTRACT

A satellite communications scheme for enhancing the communications system with existing satellites is disclosed. The existing satellites include a transponder having a phase locked loop phase demodulator at the front end thereof. The present invention discloses a technique wherein the phase demodulator is locked by transmitting a relatively high-power carrier from the ground to the satellite transponder. Once the demodulator has been locked, remote ground terminals operating at much lower power levels can access the satellite transponder by transmitting at carrier frequencies spaced apart from the primary high-power carrier. These are down-converted by the transponder phase demodulator and then typically amplitude and frequency limited before being remodulated and retransmitted.

2 Claims, 2 Drawing Sheets

LOW-POWER ACCESS TECHNIQUE FOR CERTAIN SATELLITE TRANSPONDERS

FIELD OF THE INVENTION

This invention relates to satellite transponders, and especially to satellite transponders that receive information contained in a subcarrier spectrum that has been used at the transmitter end to phase modulate the primary carrier.

BACKGROUND OF THE INVENTION

There are a number of existing satellites in orbit today carrying one or more transponders that were designed for access from a single high-power ground antenna at a relatively low data rate (for example 256 kilobits per second). These transponders have a relatively narrow bandwidth and were originally designed for data relay at either half of full duplex. The transponders employ the space ground link system (SGLS) communications format. In one type of SGLS System a subcarrier is modulated by an information signal using BPSK or QPSK modulation. Then the composite signal phase modulates the primary carrier. The frequency spectrum for SGLS technique is illustrated in FIG. 3. In one embodiment the downlink subcarrier is at 1.7 MHz on a 1839.795 MHz primary carrier, and the uplink subcarrier is at 1.25 MHz on a 1795.732 MHz primary carrier.

Candidate data traffic using these existing transponders includes: secure voice or data; image dissemination, intelligence collection, telemetry and command relay, mission data relay, and computer-to-computer data transfer. Potential users may also require a wide range of communication connectivity schemes such as: transmit and receive, receive only, interconnection to many ground users in a broadcast mode, or collection schemes.

These existing satellites require a large received carrier power to keep the satellite coherent phase demodulator locked. This characteristic prevents the usual trade-off of reducing the required transmitter effective radiated power by reducing the transmission data rate. It has been shown that an effective radiated power of approximately 80 to 90 dBm is required to keep the phase demodulator locked. Generating this kind of power requires the use of a relatively large terminal, even for very low data rates.

It would be advantageous to allow users access to these existing satellite transponders from small tactical ground terminals having a diameter of approximately four feet. Using a terminal of this size requires approximately 500 watts of transmitted RF power to keep the phase demodulator of the existing transponders in the locked mode. According to the prior art, such a high power requirement would render the use of these satellites from a tactical terminal impractical.

SUMMARY OF THE INVENTION

The present invention provides a technique for allowing access to these existing satellites by small tactical terminals through the use of a single dedicated terminal to provide the large carrier power needed to lock the satellite phase demodulator. This enables the small-terminal users to access the satellite with a direct carrier modulation scheme (no subcarrier) at a lower power. Additionally, the large dedicated terminal can provide access and network control, by any number of well-known access control schemes, such as token passing. This terminal supplies approximately two-thirds of the radio frequency power received at the satellites, enough carrier power to keep the satellite phase demodulator locked. The multiple small terminals can also share the satellite bandwidth with little interference from the large terminal carrier, using multiple access techniques such as frequency division multiple access, time division multiple access, or code division multiple access, and various hybrids of these techniques.

BRIEF DESCRIPTION OF THE DRAWINGS

The present invention can be more easily understood, and the further advantages and uses thereof more readily apparent, when considered in view of the description of the preferred embodiments and the following figures in which.

DESCRIPTION OF THE PREFERRED EMBODIMENTS

Figure 1:
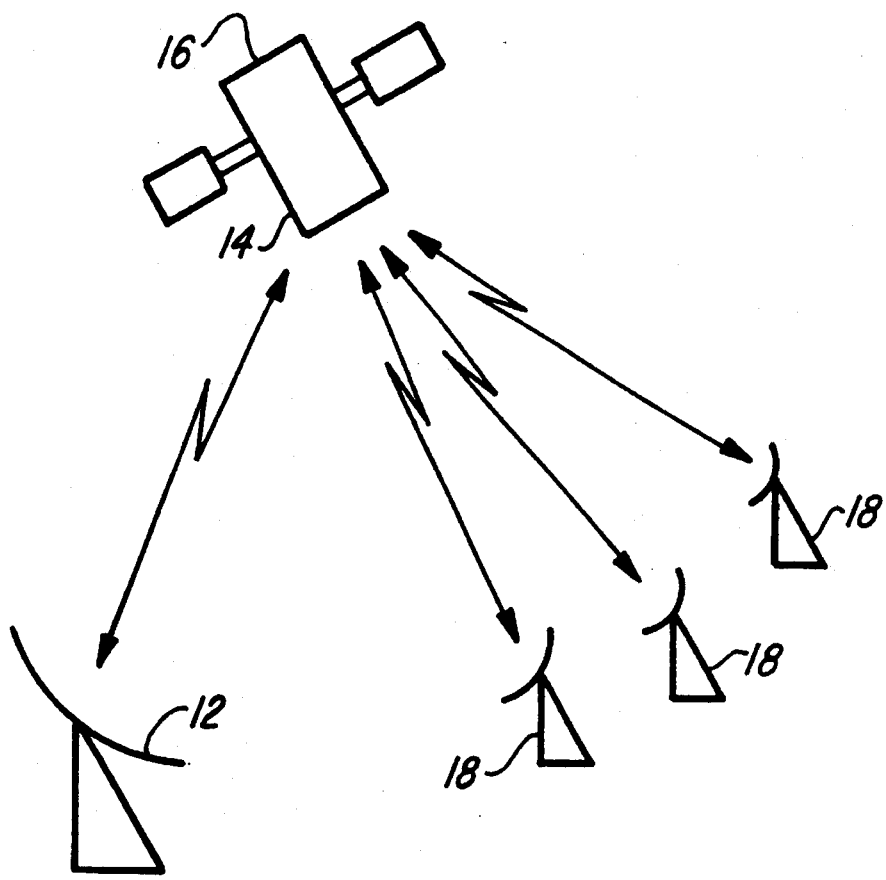
FIG. 1 is a diagrammatic representation of a satellite and its communicating terminals.

FIG. 1 shows a satellite communications systems 10 constructed according to the teachings of the present invention. A direct link terminal 12 communicates with a transponder 14 carried by a satellite 16. The direct link terminal 12 supplies sufficient carrier power to lock a phase demodulator 34 (see FIG. 2) of the transponder 14. With the phase demodulator 34 locked, lower power signals from one or more small remote terminals 18 can be relayed by the transponder 14, as will be described below. The small terminals 18 can employ any of the well-known binary modulation schemes to modulate the subcarrier, but the subcarrier itself is not transmitted. These signals are down converted by the phase demodulator because they appear outside its loop bandwidth, so they are available for communicating signals directly from one of the small terminals 18 to another or indirectly via retransmission by the direct link terminal 12.

Figure 2:
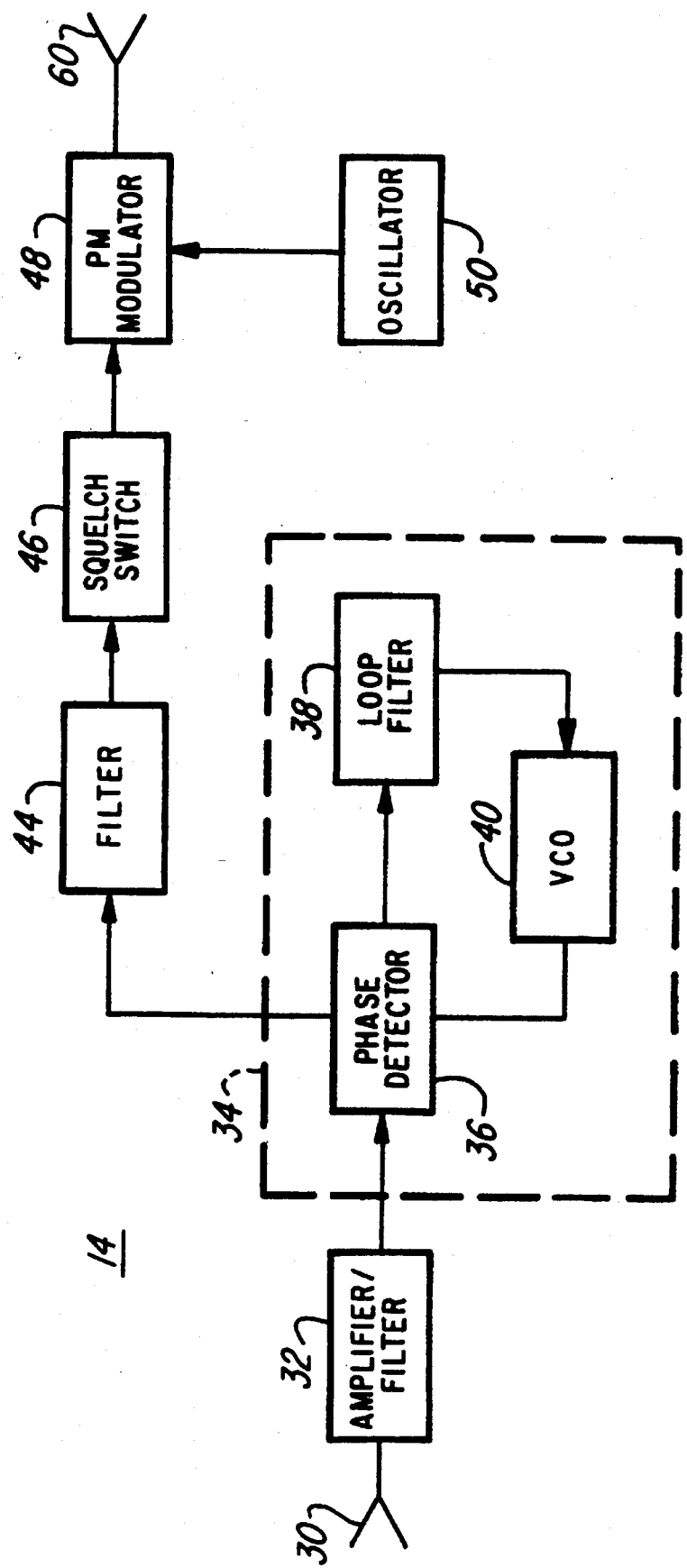
FIG. 2 is a schematic diagram of a typical transponder carried by the satellite shown in FIG. 1.

FIG. 2 is a schematic diagram of a typical transponder 14. A receiving antenna 30 is responsive to a signal transmitted by the direct link terminal 12 or one of the remote terminals 18. The signal from the antenna 30 is then amplified and filtered as represented by an amplifier/filter unit 32. As shown, a typical phase demodulator 34 includes a phase detector 36, a loop filter 38, and a voltage controlled oscillator 40. These elements together form a phase locked loop that phase demodulates the carrier signal from the direct link terminal 12. Signals from the small terminals 18, which fall in the subcarrier passband (in one embodiment approximately 1.7 MHz above the primary carrier) will then produce signals centered at the subcarrier frequency (e.g., 1.7 MHz at the output of the phase demodulator 34). A filter 44 is centered at the frequency of the subcarrier and has a bandwidth sufficient to pass signals in the subcarrier passband. With sufficient carrier power from the direct link terminal 12, the squelch switch 46 is closed and the subcarrier signal passes through the squelch switch 46 to the phase modulation modulator 48. Using the signal produced from an oscillator 50, the PM modulator 48 remodulates and amplifies the subcarrier signal and transmits it over an antenna 60.

Figure 3:
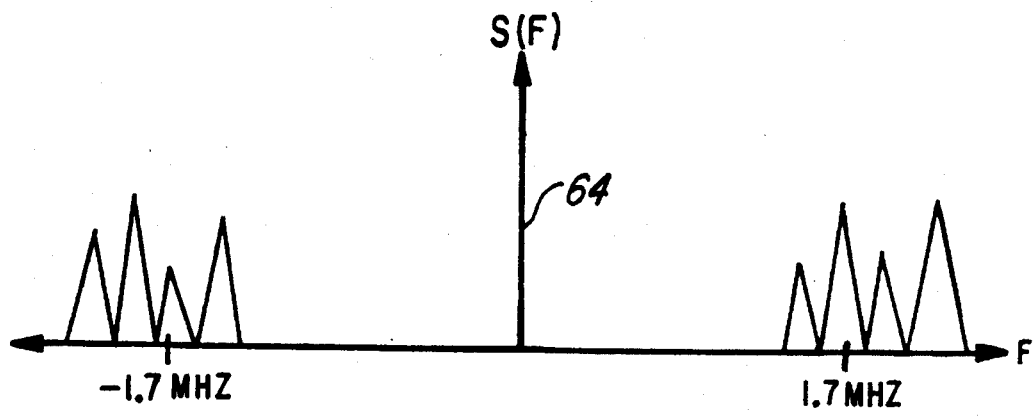
FIG. 3 is a frequency spectrum diagram of the SGLS technique.

The frequency spectrum of the primary carrier and the subcarriers is illustrated in FIG. 3.

While the preferred embodiment of the present invention utilizes an existing satellite transponder that responds to energy 1.25 and 1.7 MHz away from the primary baseband carrier, (i.e., having subcarriers centered at 1.25 and 1.7 MHz from the primary carrier) the techniques of the present invention are also applicable to other existing satellite systems. For example, many satellites have a command and control channel centered at the baseband frequency. This command and control channel may be used infrequently to send information to the satellite for the purpose of controlling various aspects of the satellite's orbit. The techniques of the present invention can be applied to these existing satellites by taking advantage of the bandwidth available in the command and control channel and using this bandwidth to access the satellite transponder. For example, depending on the modulation scheme employed, there may be approximately 1 MHz of bandwidth available in the command and control channel on many of these satellites. A primary carrier at the baseband frequency would be transmitted to the satellite to open up the phase demodulator as discussed above. Information can then be relayed via the satellite by phase modulating a subcarrier spaced away from the primary carrier, but within the channel bandwidth. If, for example, BPSK modulation is used to generate a 1 kb/s signal at 10 KHz above the SGLS uplink carrier frequency by a remote terminal 18, when the satellite is illuminated by the primary carrier from the direct link terminal 12, the phase demodulator is locked and the BPSK signal can pass into the transponder for remodulation and retransmission at 10 kHz above the SGLS downlink carrier frequency.

The key to the operation of this invention, in its various embodiments, is recognition of the fact that the phase demodulator 36 acts as a mixer for signals outside its loop filter bandwidth. When the signal received at the satellite is a primary carrier phase modulated by subcarriers, then it can be seen that the primary carder simply opens the phase demodulator and the phase demodulator serves as a coherent frequency down converter for the subcarrier signals. In the preferred embodiment, the low-power carriers are not coherent with the high-power carriers, but are nevertheless down-converted by the phase demodulator. Those skilled in the art will recognize that there is generally a performance penalty to be paid for using the phase demodulator as a down converter, relative to a true coherent system.

While we have shown and described an embodiment in accordance with the present invention, it is understood that the same is not limited thereto but is susceptible to numerous changes and modifications as are known to a person skilled in the art, and we therefore do not wish to be limited to the detail shown and described herein but intend to cover all such changes and modifications as are obvious to one of ordinary skill in the art.

What is claimed is:

1. A satellite communication system for communicating low-power information signals between ground terminals including:

a satellite transponder including a receiver and a transmitter;

a first ground terminal for transmitting a relatively high-power primary carrier signal to said satellite transponder;

a plurality of second ground terminals, at least one of said plurality of second ground terminals transmitting relatively low-power information signals to said satellite transponder, wherein each of the low-power information signals comprise a carrier signal and at least one information sideband;

wherein said receiver includes a phase demodulator for receiving the primary carrier signal, wherein the phase demodulator includes locking means for locking the phase demodulator in response to the receipt of the primary carrier, said locked phase demodulator includes means for down converting and demodulating each of said low-power information signals; and means for remodulating and retransmitting the down converted information signal by said transmitter to at least one of said plurality of second ground terminals.

2. A method for communicating low-power information signals between ground terminals with a satellite transponder, said satellite transponder including a receiver and a transmitter and wherein the receiver includes a phase demodulator, said method including the steps of:

transmitting a relatively high-power carrier signal to the satellite transponder from a first ground terminal;

transmitting relatively low-power information signals to the satellite transponder from at least one of a plurality of second ground terminals wherein each of the low-power information signals comprise a carrier signal and at least one information sideband;

locking the phase demodulator upon the reception of said primary carrier signal;

down converting and demodulating each of said low-power information signals in response to the locked phase demodulator; and remodulating and retransmitting each of said low-power information signals to at least one of said plurality of second ground terminals.

* * * * *